(No Model.) 4 Sheets—Sheet 1.
O. J. FUCHS.
SPEED RECORDER AND ODOMETER.
No. 484,152. Patented Oct. 11, 1892.
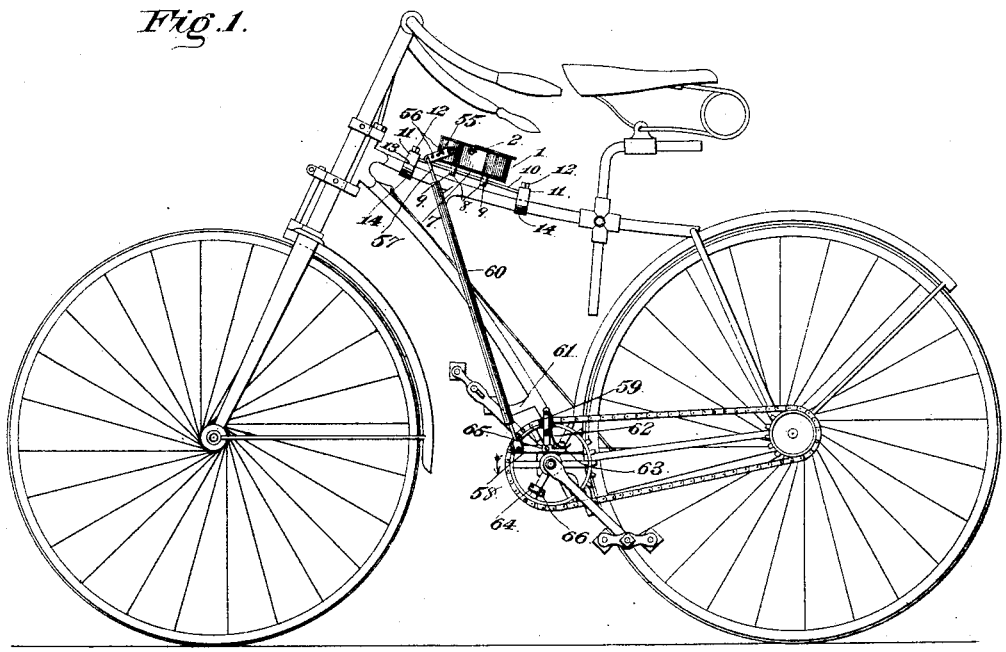
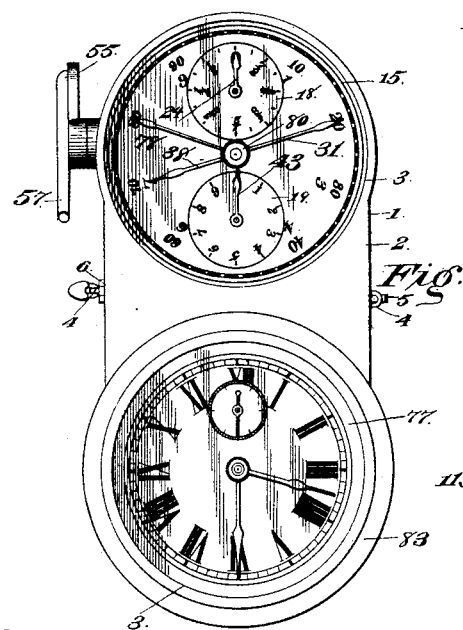

(No Model.) 4 Sheets—Sheet 2.

O. J. FUCHS.
SPEED RECORDER AND ODOMETER.

No. 484,152. Patented Oct. 11, 1892.

Witnesses
M. E. Fowler
D. P. Wolhaupter

Inventor
Oscar J. Fuchs
By his Attorneys,
C. A. Snow & Co.

(No Model.) 4 Sheets—Sheet 3.

O. J. FUCHS.
SPEED RECORDER AND ODOMETER.

No. 484,152. Patented Oct. 11, 1892.

Witnesses
M. Fowler
D. P. Hochhauser

Inventor
Oscar J. Fuchs
By his Attorneys,
C. A. Snow & Co.

(No Model.) 4 Sheets—Sheet 4.
O. J. FUCHS.
SPEED RECORDER AND ODOMETER.
No. 484,152. Patented Oct. 11, 1892.
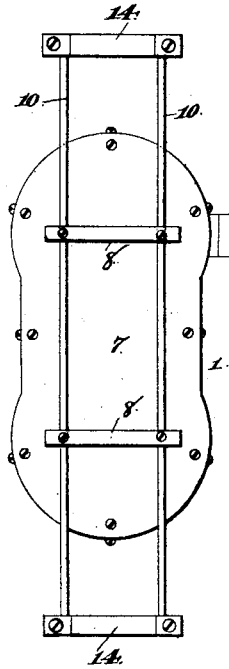
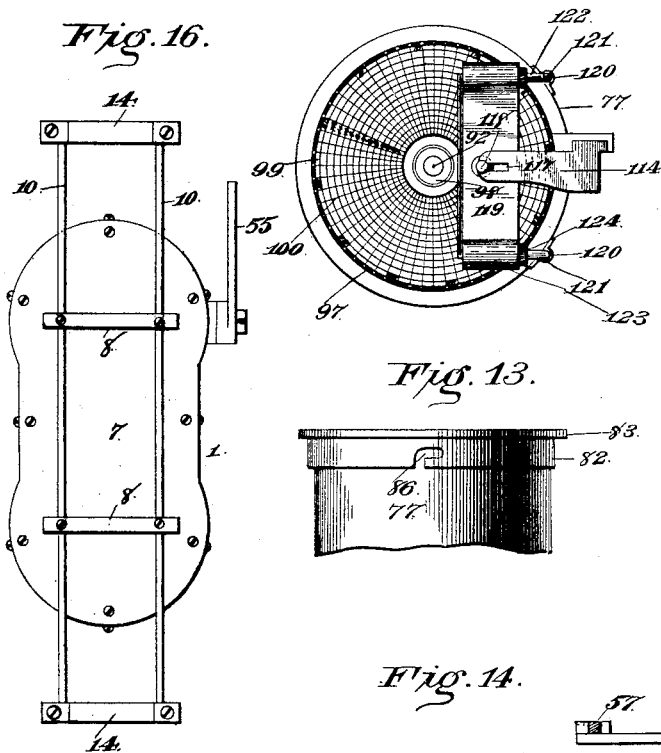
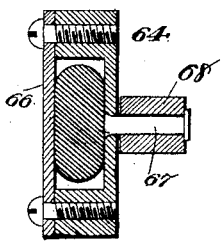
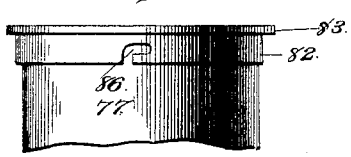
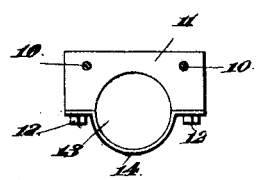
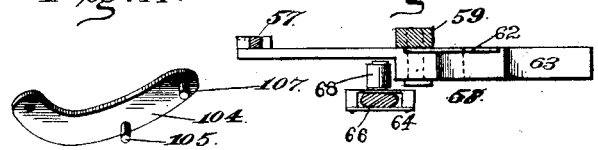
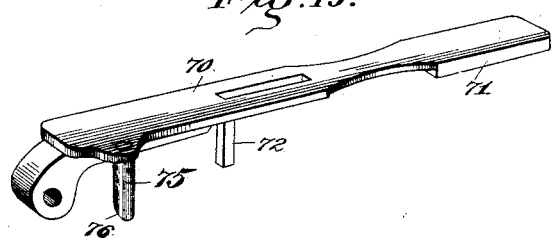
Witnesses
M. Fowler
D. P. Northampton
Inventor
Oscar J. Fuchs
By his Attorneys,
C. A. Snow & Co.

UNITED STATES PATENT OFFICE.

OSCAR JOSEPH FUCHS, OF CHILLICOTHE, OHIO, ASSIGNOR OF ONE-HALF TO SAMUEL EARL MOSHER, OF SAME PLACE.

SPEED-RECORDER AND ODOMETER.

SPECIFICATION forming part of Letters Patent No. 484,152, dated October 11, 1892.

Application filed September 10, 1891. Serial No. 405,304. (No model.)

*To all whom it may concern:*

Be it known that I, OSCAR JOSEPH FUCHS, a citizen of the United States, residing at Chillicothe, in the county of Ross and State of Ohio, have invented a new and useful Cyclometer and Speed-Recorder, of which the following is a specification.

This invention relates to speed-recorders and cyclometers; and it has for its object to provide a combination cyclometer and speed-recorder which is adapted for use on bicycles, tricycles, buggies, wagons, and other vehicles, being particularly adapted for use upon the ordinary Safety bicycles, the device being constructed and arranged so as to indicate miles and fractions of miles accurately from a quarter or an eighth up to thousands, which can of course be varied according to the use to which the instrument is applied, and besides indicating the distance traversed it also accurately registers the time consumed in covering the distances indicated by the cyclometer; and with these and other objects in view, which will readily appear as the nature of the device is understood, the invention consists in the novel construction hereinafter more fully described, illustrated in the accompanying drawings, and specifically pointed out in the claims.

Figure 3:
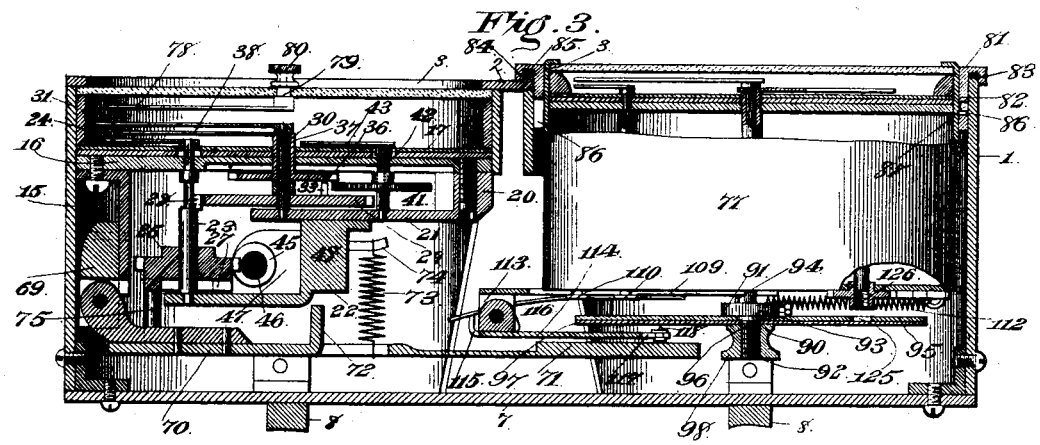
Figure 4:
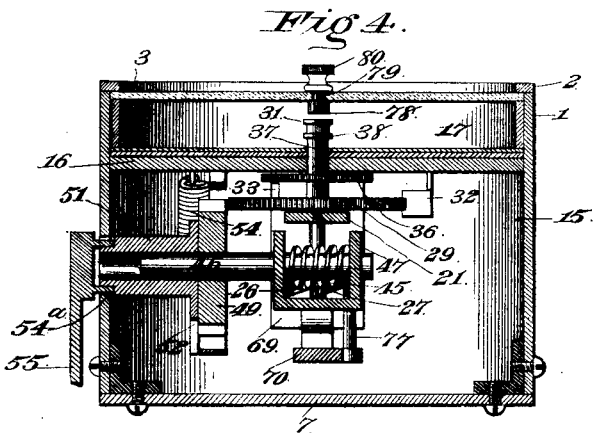
Figure 5:
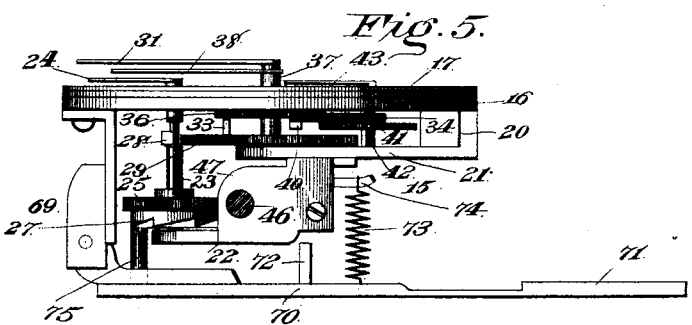
Figure 8:
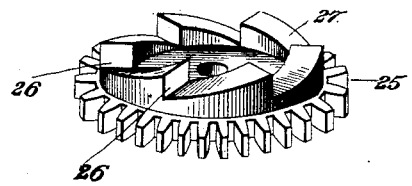
Figure 19:
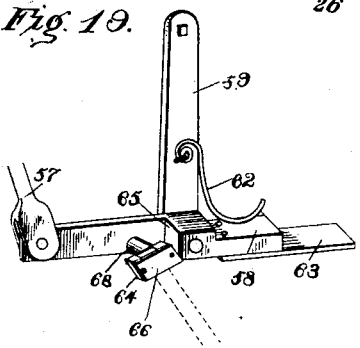
Figure 9:
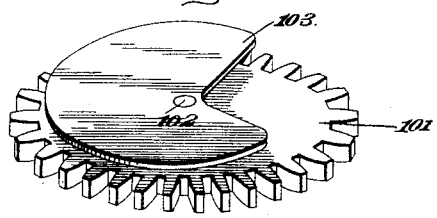
Figure 10:
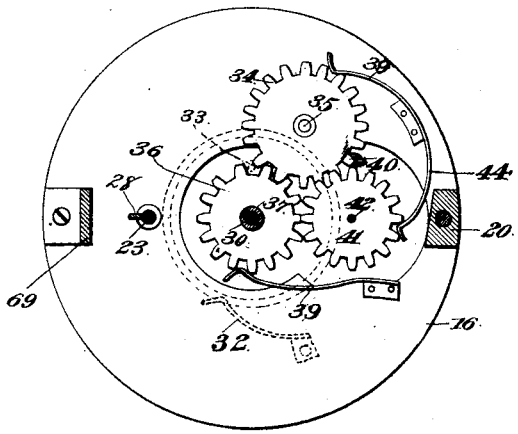
Figure 12:
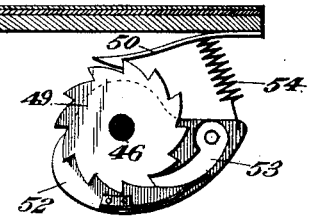

In the accompanying drawings, Figure 1 is a side elevation of a Safety bicycle having my improved cyclometer and speed-recorder attached thereto. Fig. 2 is a top plan view of a cyclometer and speed-recorder constructed in accordance with my invention. Fig. 3 is a vertical longitudinal sectional view of the same. Fig. 4 is a transverse sectional view taken through the cyclometer. Fig. 5 is a side elevation, partly in section, of the cyclometer. Fig. 6 is a bottom plan view of the registering or recording attachment with the registering-disk removed. Fig. 7 is a detail in perspective of the sliding recording attachment working upon the back of or on the bottom of the clock. Fig. 8 is a detail in perspective of the hammer-operating pinion. Fig. 9 is a detail in perspective of the sliding recording-attachment-operating pinion. Fig. 10 is a plan view of the cyclometer-gearing under the dial-plate, the operating-shaft and supporting-brackets being removed. Fig. 11 is a bottom plan view of a portion of the device, showing the inking attachment secured thereto. Fig. 12 is a detail of the pawl-and-ratchet device. Fig. 13 is a similar view of the clock-casing. Fig. 14 is a detail in perspective of the curved lever. Fig. 15 is a similar view of the hammer. Fig. 16 is a bottom plan view of the instrument. Fig. 17 is a detail sectional view of the sprocket clip and roller. Fig. 18 is a top plan view of the walking-beam. Fig. 19 is a detail in perspective of the walking-beam attachment.

Referring to the accompanying drawings, 1 represents an elongated casing, within which the various parts of the device are secured, and said casing is inclosed by the top plate or cap 2, which is provided with the circular openings 3, through which observations are readily made in the manner to be presently described. The casing is further provided on each of its parallel sides with the staples 4, each of which is engaged, respectively, by the hook 5 and the hinged hasp 6, the said hook being bent upwardly, so that when the hasp is secured upon the staple 4 by an ordinary padlock the top of the instrument cannot be removed or tampered with. The bottom 7 incloses and holds in position within the casing the various parts and is provided with the transverse lugs 8, each of which are provided with the corresponding perforations 9, which are designed to accommodate the wires or rods 10, forming a spring-frame, upon which the meter and recorder rests, the ends of said rods or supporting-wires being secured at their ends in the securing-clips 11, each of which are provided with set-screws 12, by means of which the same may be adjusted to the space within which the instrument is placed, and said clips are provided with semicircular recesses 13, which are spanned by the spring-clasps 14, securing the device to the backbone of the bicycle, as illustrated in the drawings.

Within the described casing and located in one end thereof is the distance-meter or cyclometer portion of the device 15. The cyclometer is provided with a top circular metallic plate 16, suitably secured within the casing by screws or other securing means, and is provided with the front dial-plate 17, directly beneath one of the openings 3 in the cap of the casing, covered with glass, as is usual of devices of this character, to keep dust and other foreign substances out of the instrument. Upon said plate 16 is mounted the mechanism which communicates motion to the hands revolving over the face of the dial, which is graduated to indicate fractions of miles, hundreds of miles, and thousands of miles. The small supplemental dial 18 at the top of the main dial-plate is graduated to indicate one mile or a fraction of a mile. The circumference of the main dial itself is graduated so as to indicate single miles to one hundred, and also with a supplemental row of figures thereunder which indicate each hundred to one thousand miles, in the manner to be hereinafter described, and the lower supplemental dial 19 is designed to indicate each thousand mile to ten thousand, which graduations, of course, may be varied to suit the manufacturer. Rigidly secured upon a lug 20, projecting inwardly from the rear of said plate 16, is the horizontal supporting and journal plate 21, to the top of which is secured the angular plate or bracket 22, in the outer end of which is journaled one end of the shaft 23, the other end of which is journaled in said plate and carries upon the face of the dial the indicating-hand 24 that travels upon the face of the supplemental dial-plate 18 and indicates fractions of a mile to one mile. Mounted upon the shaft 23, directly above the angle-bracket 22, is the worm-pinion 25, the under face of which is provided with a series of notches 26, formed by the independent inclined faces 27, which are designed to operate the recording attachment, to be presently described, as the said shaft revolves. The shaft 23 is further provided adjacent to the circular disk or plate 16 with a longitudinally-disposed lug or projection 28, which at each revolution of the shaft is designed to engage one of the cogs of the horizontal pinion 29, mounted upon the shaft 30, journaled in the outer end of the journal-plate 21, mounted over and upon said circular plate or disk 16, parallel therewith, and the other end of said shaft is journaled in the said circular plate or disk and carries upon its outer end the long indicating-hand 31, traveling around the circumference of the main dial-plate, and indicates each consecutive mile up to one hundred, being actuated by each revolution of the shaft 23, and said pinion is prevented from turning more than necessary by the spring 32, secured to the main disk or plate and engaging the notched periphery of the pinion. The horizontal pinion 29 is provided with an upwardly-projecting pin 33, that at each revolution of said wheel or pinion is designed to mesh with the cog-wheel 34, mounted upon a stub-shaft 35, adjacent to said horizontal pinion, and by engaging one of the cogs of said wheel causes the same to turn sufficiently to in turn to slightly revolve the cog-wheel 36 directly above said horizontal pinion and mounted upon a sleeve 37, working over the shaft 30, upon which said horizontal pinion is mounted, and the outer end of said sleeve carries over the face of the dial the small indicating-hand 38, traveling around the circumference of the main dial and indicating each hundred to one thousand miles, being actuated only at each entire revolution of the shaft carrying the large hand, indicating from one to a hundred miles. Each of said meshing cog-wheels are held steady and regular in their intermittent partial revolution by means of the leaf-spring pawls 39, bearing upon the cog of each, respectively.

The side cog-wheel 34, mounted upon the stub-shaft 35, is provided upon one of its cogs with the downwardly-extending lug 40, which at each revolution of said cog-wheel, and therefore of the hand indicating each hundred to a single thousand, is designed to mesh with the small cog-wheel 41, mounted upon the shaft 42, journaled in said parallel plate 21, and carrying upon its outer end on the face of the dial the small hand 43, traveling over the face of the lower supplemental dial 19 and indicating each thousand to ten thousand miles. Said small cog-wheel 41 and the shaft upon which the same is mounted are also regulated in their movement by means of the leaf-spring pawl 44, secured to the back of the face or dial plate and pressing against the cog-periphery of the wheel.

Motion is imparted to the various hands traveling over the face of the dial by means of the worm 45, carried by the worm-shaft 46, and meshing with the worm-pinion 25 upon the shaft 23, indicating miles and fractions thereof. The said shaft 46 is rigidly journaled upon each side of the worm thereon in the opposite side plates 47, secured by suitable screws and pins parallel with each other upon opposite sides of said angle-bracket 22 and to the block 48, rigidly secured to said angle-bracket. Said plate, besides serving as a journal for said worm-shaft, also incloses the worm thereon and additionally protects the same from dust and other matter. The worm-shaft 46 is provided with the actuating ratchet-wheel 49, rigidly mounted thereon and held regular in its intermittent movement by means of the spring-pawl 50, secured to the circular plate or disk 16 and pressing thereunder. A sleeve 51 is loosely mounted upon said worm-shaft 46, beyond the ratchet-wheel thereon, and carries at one end the integral plate 52, upon the face of which is pivotally secured the spring-actuated dog 53, that is designed to engage the teeth of the ratchet-wheel as the said sleeve is alternately worked backward and forward by the motion of the vehicle to which the instrument is attached, said plate and sleeve being always withdrawn to its normal position in engagement with the next lower tooth of the ratchet-wheel after partly revolving the same by means of a coil-spring 54, connected therewith and the plate upon which the cyclometer is mounted. The sleeve 51 projects without the perforation $54^a$, located in the side of the casing, and is connected in any suitable manner with the operating vibrating lever 55. The said operating-lever 55 is provided with a series of perforations 56 that is designed to be adjustably engaged by one end of the rod 57, secured thereto, and the other end of which is connected with the walking beam or lever 58, pivotally secured to the arm 59, rigidly connected to the frame of the bicycle, as illustrated in Figs. 1 and 19 of the drawings. A hollow tube 60 incases the operating-rod 57 and is supported from the backbone and frame of the bicycle by arms 61, suitably secured thereto. The said walking-beam is normally held in position to be operated by means of the spring 62, secured to the arm 59, and bearing upon one end of the walking-beam. The said walking-beam carries a straight leaf-spring 63, securely riveted or otherwise firmly secured to and projecting beyond the spring-pressed end thereof, which spring is engaged at every revolution by the roller of the bracket 64, secured, as illustrated in the accompanying drawings, to one of the spokes of the driving sprocket-wheel employed in ordinary Safety bicycles, and by means of which a vibrating motion is imparted to the lever operating the cyclometer described. The walking-beam is further provided with a square offset 65, opposite the spring-pressed end thereof, which allows the roller of said bracket to pass by and over the top of the beam when the machine is moved. It will be also noted that the roller of said bracket, after striking the spring 63 and passing beyond the same and over the top of the walking-beam, will pass in the offset or over the shoulder 65, and thereby clear the opposite end of the beam, as can be clearly seen in detail, Fig. 18 of the drawings, and it will also be apparent that when the bicycle is moved backward the said roller will pass through the offset 65 back over the beam and will snap over the light leaf-spring 63 without moving the beam sufficiently to turn the meter, on account of said spring being secured to the under side of one end of the walking-beam. The said bracket is provided with a clip or clamp 66, Fig. 17, by means of which the same may be readily attached to the sprocket-wheel or other portion of the running-gear of the vehicle, and the said bracket is further provided with a centrally-located pivot 67, upon which is loosely journaled the operating-roller 68, which actuates the said walking-beam and vibrating lever in the manner described.

Pivotally secured in the lower bifurcated ends of the bracket 69, secured to the circular plate or disk 16, adjacent to the shaft 23, journaled therein, is the recording-hammer 70, which extends horizontally from the cyclometer portion of the instrument to directly over the recording device located in the opposite end of the casing. The said hammer is provided with an enlarged head 71 and with the upwardly-turned stop 72, that is designed to bear upon the stop-block 48, secured to the angle-bracket 22, and which is designed to limit the upward movement of said elongated hammer, which is normally drawn upward by the tension of the coil-spring 73, secured thereto, and a pin 74, projecting outwardly from said stop-block. The pivoted hammer is provided near its pivotal connection with said upright bracket with an upwardly-extending stud 75, provided with a beveled end 76, that is designed to ride under the inclined faces 27, formed upon the bottom of the worm-pinion 25, and as said stud rides under the inclined faces and is drawn upward into the notches 26 at the ends of said faces it can be readily seen that the hammer is alternately depressed and sharply elevated, according to the number of notches upon the lower face of said worm-pinion. The hammer is designed to record the speed which is made by the vehicle by registering the same through the medium of the recording attachment secured to the back of an ordinary clock 77, the mechanism of which also actuates a portion of the recording attachment. In order that the distance traversed may be accurately indicated by the cyclometer, the starting-point is indicated by means of the hand 78, secured to the short shaft 79, journaled in the glass covering the opening beneath which the cyclometer-dial is located, and said hand is conveniently turned to the point desired by the milled thumb-nut 80, secured to the outer end of said hand-shaft, and the difference between said supplemental hand and the mile-hand will readily indicate the traversed distance.

The clock 77 is of ordinary construction, and the face of the same is covered or inclosed by the rim 81, which is provided with the downwardly-extending flange 82, that is designed to extend down over the edge of the casing, within which the works of the clock are inclosed, and said rim is further provided with the encircling groove 83, formed between said flange and the smaller encircling flange 84, and said groove is designed to receive the packing-ring 85, which as said rim takes over the edge of the circular opening 3, within which the clock is secured, the said packing excludes dust and other material from within the inclosing casing. The large encircling flange 82 is provided with the opposite bayonet-slots 86, by means of which the said clock and the mechanism carried thereby may be easily inserted within the casing by said bayonet-slots engaging the opposite pins 87, projecting inwardly near the outer edge of the end of the casing in which the clock is secured. A suitable locking device may be secured within the casing for the purpose of locking the clock attachment therein, so that the same may not be removed, and also for the purpose of locking the vibrating operating-lever 55, in order that the cyclometer and speed-recorder cannot be operated by anyone when the vehicle is left standing.

A suitable portion of the rear or bottom inclosing cap-plate of the clock is removed in order that the recording attachment may be secured thereto. Upon the inner end of the center post of the clock to which the minute and hour hands are attached is secured the collar 90, having a flange 91, and the downwardly-extending screw-threaded stud 92, said flange being provided on each face thereof with the downwardly-extending pin 93 and the upwardly-extending pin 94, respectively, the outer face of said flange being designed to support and carry the circular registering disk 95, carried around by the revolutions of the center-post and provided with a small perforation 96, that is engaged by the downwardly-extending pin 93, projecting from the lower face of said flange, and thus provides means whereby the said disk is revolved.

A graduated recording-paper disk 97 is designed to be placed directly under and upon the revolving disk 95 by means of the thumb-nut 98, working over the screw-threaded stud of said collar upon the center-post and bearing directly upon said recording-paper disk. The said paper is provided with an optional number of concentric circles 99, which indicate hours and are so numbered, and with a series of radiating lines 100, which are numbered to indicate the minutes, so that when the mark is made upon said revolving paper, in the manner to be described, the hour and minute of the time which was consumed in traversing a certain distance is indicated through the medium of the recording-hammer 70, connected with the cyclometer. When the recording or registering paper is placed or secured under the metallic disk carried by the center post, the "60" space marked thereon is so placed as to correspond to that on the front dial of the clock, so that if the hand of the clock points to a certain number of minutes upon the dial of the clock, the marker which is used to record upon the graduated paper should stand in a corresponding position upon or directly over said paper, which is accomplished by the mechanism now to be described. The upper or upwardly-extending pin or stud 94, projecting from the top of the said flange 91, is designed at every revolution of the center-post of the clock carrying the hands to partially revolve the cog-wheel 101, mounted upon a stub-shaft 102, secured in the back of the clock, one edge of said wheel being designed to extend over said flange 91, in order that the pin projecting above may engage one of the cogs thereof. Secured above said cog-wheel and carried thereby is the cam-plate 103, which as the said wheel revolves is designed to swing the curved lever 104 by bearing against the pin or stud 105, projecting downwardly from said lever, which in its back-and-forth movement is designed to work between said cog-wheel and the cam-plate carried thereby, said cog-wheel being steadied and regulated in its movement by means of the leaf-spring pawl 106, secured to the back of the clock and bearing against the cog-periphery. The outer end of said curved lever 104 is provided with a supplemental pin or projection 107, which connects the same with the sliding marking-plate 108. The said plate is provided with a longitudinal slot 109, extending the entire length thereof and designed to work or engage over flanged rivets or studs 110, also secured to the clock, and the said slot in the sliding movement of said plate is also designed to work over the center post of the clock carrying the graduated registering-plate. The sliding plate 108 is further provided on one side of the longitudinal slot with the short transverse slot 111, which is engaged by the pin or projection 107 at the end of the curved lever 104, and as said lever is moved by the cam-plate from the revolutions of the clock it can be readily seen that the sliding plate will be slid out and away from the center of said clock, and after the cam-plate has overridden the engaging-pin upon the said curved lever the said plate will immediately be withdrawn inward by the tension of the coil-spring 112, secured to one end thereof and to the back of said clock. The outer end of said sliding plate is provided with the perforated lugs 113, between which is pivoted the strike-arm 114, having the lateral upwardly-extending projections 115 near it pivotal connection, and against which the leaf-spring 116 bears and holds said arm in a position parallel with the sliding plate, to which said spring is also secured. The other end of said strike-arm 114 is provided with a short longitudinally-disposed slot 117, within which is inserted the pointed puncturing or marking point 118, which, as the sliding arm is operated in the manner described by the revolutions of the clock, will stand directly over the space and line upon the graduated recording-plate corresponding to the hour and minute indicated by the timepiece. As the cyclometer is operated by the motion of the vehicle to which it is attached the hammer 70 will be at intervals sharply brought to bear directly upon the marking-point 118, secured in the end of the strike-arm 114, thus causing a puncture to be made upon the recording-disk which will indicate the speed of the vehicle by marking the exact time which has been consumed in traveling the distance required to operate the recording-hammer, which may be regulated according to the number of notches upon the top of the worm-pinion previously referred to. By changing the number of cogs in the cog-wheel 101, operated by the motion of the clock, the raising and lowering of the marking-point by the sliding marking-plate may be made to correspond with the number of circles or hours which are indicated on the registering-paper. Instead of puncturing the speed-recording paper, if desired, an ordinary inking-ribbon 119 may be interposed between said point and the graduated plate revolving thereunder. As illustrated in the drawings, to secure the ribbon in the desired place upon the back of the clock, opposite sockets 120 are secured to the side of the clock-casing, and are adapted to receive the rods 121, each of which are provided with right-angularly bent ends 122, upon which are journaled the parallel rollers 123, over which the inking-ribbon 119 is wound, the said rollers 123 being provided with the milled heads 124, by means of which the ribbon can be readily turned to utilize its whole area.

In order that the clock may be readily wound when desired, I provide the dial-plate with a circular hole 125, which will permit the insertion of a threaded key to engage the socket 126, located in the end of the shaft carrying the spring which actuates the clock-movement.

The construction and operation of my improved cyclometer and speed-recorder are now thought to be apparent without further description.

Having thus described my invention, what I claim, and desire to secure by Letters Patent, is—

1. In a cyclometer and speed-recorder, the combination of the casing having the transverse perforated lugs, parallel spring-supporting rods adjustably secured within said lugs, metallic clips adjustably secured upon the ends of said rods and having semicircular recesses and spring-clasps spanning said recesses, substantially as set forth.

2. In a cyclometer, a dial-plate, a worm-shaft horizontal to said plate and provided with a screw-worm and a pawl-and-ratchet operating device, a hand-shaft vertically journaled in said plate and provided with a laterally-disposed projection, a worm-pinion mounted upon said shaft and meshing with said worm, a hand-operating shaft carrying a pinion engaged by the projection on said shaft at every revolution thereof and provided with an upwardly-projecting pin, a cog-wheel mounted upon said plate adjacent to said pinion and engaged by the upwardly-projecting pin thereof, and a hand-carrying shaft having a cog-wheel located above said pinion and meshing with said adjacent cog, substantially as set forth.

3. In a cyclometer, a dial-plate, a worm-shaft provided with a screw-worm and a pawl-and-ratchet device, a hand-shaft carrying a worm-pinion meshing with said worm and provided with a projection, a hand-shaft carrying a pinion engaged by said projection and provided with an upwardly-extending pin, an adjacent cog-wheel operated by said pin and having a downwardly-extending lug, a hand-carrying wheel beneath said wheel and engaged by said adjacent cog, and a supplemental hand-carrying wheel engaged by the lug of said adjacent cog-wheel, substantially as set forth.

4. In a cyclometer, a dial-plate, a worm-shaft provided with a screw-worm and a pawl-and-ratchet device, a hand-shaft carrying a worm-pinion meshing with said worm and provided with a projection, a hand-shaft carrying an operating-pinion engaged by said projection and provided with an upwardly-extending pin, an independent adjacent cog-wheel operated by said pin and having a downwardly-extending lug, a hand-operating cog-wheel working over the shaft of said pinion above the same and engaged by said adjacent cog-wheel, a supplemental hand-operating cog-wheel engaged by the lug of said adjacent cog-wheel at every revolution thereof, and spring-pawls engaging the peripheries of said pinions and cog-wheels, substantially as set forth.

5. In a cyclometer, the combination, with the worm-pinion and the intermeshing and engaging hand operating-pinions, of the worm-shaft carrying a ratchet-wheel rigidly mounted on said shaft, a sleeve mounted upon said shaft adjacent to said ratchet-wheel and provided with an enlarged spring-actuated plate, a spring-actuated dog mounted upon said plate and engaging said ratchet-wheel, a spring-pawl normally engaging said ratchet-wheel, and means for operating said sleeve, substantially as set forth.

6. In a cyclometer, the combination, with the hand-operating wheels and the pawl-and-ratchet device connected therewith, of the vibrating lever connected with said pawl-and-ratchet device, a walking-beam pivotally connected to the frame of the vehicle, a rod adjustably connecting said lever with said walking-beam, and a projection secured to the driving-gear and adapted to engage the free end of said walking-beam, substantially as set forth.

7. In a cyclometer, the combination, with the hand-operating wheels and the pawl-and-ratchet device connected therewith, of the vibrating lever connected with said pawl-and-ratchet device, a spring-pressed walking-beam pivotally connected to the frame of the vehicle, a contact-spring secured to the spring-pressed end of said walking-beam, a rod adjustably connecting the other end of said walking-beam with said lever, and a projection secured to the driving-gear and adapted to engage the spring end of said walking-beam, substantially as set forth.

8. In a cyclometer, the combination, with the hand-operating wheels and the pawl-and-ratchet device connected therewith, of the vibrating lever connected with said pawl-and-ratchet device, a spring-pressed walking-beam pivotally connected to the frame of the vehicle, a rod adjustably connecting said lever with said walking-beam, a tubular guard or shield incasing said connecting-rod, and a clamp secured to the driving-gear of the vehicle and carrying a loosely-mounted roller adapted to engage the free end of said walking-beam, substantially as set forth.

9. In a cyclometer and speed-recorder, the combination, with the hand-operating wheels, of the worm-pinion provided with a notched face, a spring-drawn hammer pivoted adjacent to said pinion and provided with an upwardly-extending beveled pin or stud traveling under said notched face, the speed-recording dial revolved by clock-movement, and a sliding spring-controlled marking attachment located over said dial above said hammer, and also operated in one direction by the movement of the clock, substantially as set forth.

10. In a cyclometer and speed-recorder, the combination, with the hand-operating wheels, of the worm-pinion provided with a notched face, a spring-drawn hammer pivoted adjacent to said pinion and operated by the notched face thereof, a clock, a speed-recording dial secured to the center post of said clock, and a sliding spring-controlled marking attachment located under said dial above said hammer and slidingly operated in one direction by the movement of said center post, substantially as set forth.

11. In a cyclometer and speed-recorder, the combination, with the hand-operating wheels, of the worm-pinion provided with a series of notches and inclined projections, a spring-controlled hammer pivoted adjacent to said pinion and provided with an upwardly-extending stop and an upwardly-extending beveled pin or stud traveling over said inclined projections and notches, a clock, a speed-recording dial rotated by the movement of said clock, and a spring-controlled marking attachment located over said dial above the hammer and slidingly operated by the clock-movement, substantially as set forth.

12. In a cyclometer and speed-recorder, the combination, with the distance-indicating mechanism and the hammer operated thereby, of a clock, a flanged collar having a downwardly-extending pin secured to the center post of the clock, a dial-plate seated upon said flange and engaging the downwardly-extending pin thereof, a spring-actuated sliding marker located between said hammer and dial-plate, and means for moving said marker back and forth over the face of said dial-plate by the clock-movement, substantially as set forth.

13. In a cyclometer and speed-recorder, the combination, with the distance-indicating mechanism and the hammer operated thereby, of a clock, a dial-plate mounted upon the center post of said clock, flanged studs, a sliding spring-actuated plate having a longitudinal slot engaging said studs and the center post of the clock, a spring-actuated strike-arm pivoted to the outer end of said plate, a marking-point adjustably secured in the end of said strike-arm, and means for moving said marker back and forth over the face of said dial-plate by the clock-movement, substantially as set forth.

14. In a cyclometer and speed-recorder, the combination, with the distance-indicating mechanism and the hammer operated thereby, of a clock, a flanged collar having a downwardly-extending pin secured to the center post of the clock and having a downwardly-extending threaded post, a dial-carrying plate seated upon said flange and engaging the downwardly-extending pin thereof, a graduated recording-plate located under said main plate, a binding-nut engaging said threaded post and bearing upon said graduated dial, a sliding marker located between said hammer and dial, and means for moving said marker back and forth over the face of said dial-plate by the clock-movement, substantially as set forth.

15. In a cyclometer and speed-recorder, the combination, with the distance-indicating mechanism and the hammer operated thereby, of a clock, a graduated dial secured to the center post, flanged studs projecting from the back of said clock, a sliding spring-actuated plate having a longitudinal slot engaging said stud and the center post of the clock and bifurcated lugs at its outer end, a strike-arm pivoted between said lugs and provided with the upwardly-extending projections near one end and a slot in the free end thereof, a marking-point adjustably secured in said slot, a leaf-spring secured to said plate and bearing under the projections of said strike-arm, and means for moving said plate and strike-arm back and forth over the face of said dial-plate by the clock-movement, substantially as set forth.

16. In a cyclometer and speed-recorder, the combination, with the distance-indicating mechanism and the hammer operated thereby, of a clock, a flanged collar having an upward-extending pin secured to the center post of the clock, a sliding marking attachment located above said hammer, a dial carried upon said flange and above the marking attachment, a cog-wheel mounted upon the clock adjacent to the center post and engaged by the upwardly-extending pin of said flange, a cam-plate carried by said wheel, and a curved lever operated by said cam-plate and connected with said marking attachment, substantially as set forth.

17. In a cyclometer and speed-recorder, the combination, with the distance-indicating mechanism and the hammer operated thereby, of a clock, a flanged collar secured to the center post of the clock and having the upwardly-extending pin, a dial carried upon said flange, a sliding marking attachment having a short transverse slot therein and located under said dial and above said hammer, a spring-pressed cog-wheel mounted upon the clock adjacent to the center-post and engaged by the upwardly-extending pin of said flange, a cam-plate carried by said wheel and a curved lever having at one end an upwardly-extending pin engaging said transverse slot, and an intermediate pin engaged by the periphery of said cam-plate, substantially as set forth.

18. In a cyclometer and speed-recorder, the combination, with the distance-indicating mechanism and a hammer operated thereby, of a clock, a graduated dial-plate mounted on the center post of said clock, a marking attachment operated by the clock-movement and located under said dial-plate and above said hammer, sockets secured upon the sides of said clock, right-angularly-bent rods seated in said sockets and projecting over said dial-plate, hollow rollers journaled on said rods parallel with said dial-plate, and an inking-ribbon rolled upon said rollers and interposed between the marker and dial-plate, substantially as set forth.

In testimony that I claim the foregoing as my own I have hereto affixed my signature in the presence of two witnesses.

OSCAR JOSEPH FUCHS.

Witnesses:
J. H. HOWARD,
GEO. PERKINS.